7/19/77 XR 4,037,097

United States Patent [19]

Stillman et al.

[11] 4,037,097

[45] July 19, 1977

[54] COLOR CHANGER FOR SPOTLIGHTS

[76] Inventors: Allen M. Stillman; Theodore Stillman, both of 1954 E. 26th St., Brooklyn, N.Y. 11229

[21] Appl. No.: 565,072

[22] Filed: Apr. 4, 1975

[51] Int. Cl.[2] ........................ F21P 5/04; F21V 11/18; F21V 9/08; G02R 7/00

[52] U.S. Cl. ................................ 240/3.1; 240/46.23; 240/46.59; 350/318

[58] Field of Search .................. 240/3.1, 46.01, 46.03, 240/46.05, 46.19, 46.23, 46.59; 352/71; 350/315, 318

[56] References Cited

U.S. PATENT DOCUMENTS

| | | | |
|---|---|---|---|
| 1,872,154 | 8/1932 | Masek | 240/3.1 X |
| 2,192,520 | 3/1940 | Levy et al. | 350/315 X |
| 3,208,339 | 9/1965 | Tiffenberg et al. | 240/3.1 X |
| 3,382,024 | 5/1968 | Councilman et al. | 240/46.03 X |
| 3,883,243 | 5/1975 | Weisglass et al. | 350/315 X |

*Primary Examiner*—George H. Miller, Jr.
*Attorney, Agent, or Firm*—Darby & Darby

[57] ABSTRACT

A slide changer mechanism for a spotlight in which each slide is operated by a separately controlled actuator through a crank arm. The changer mechanism is of modular construction so that it can be adapted to operate with existing spotlights.

7 Claims, 6 Drawing Figures

FIG. 5
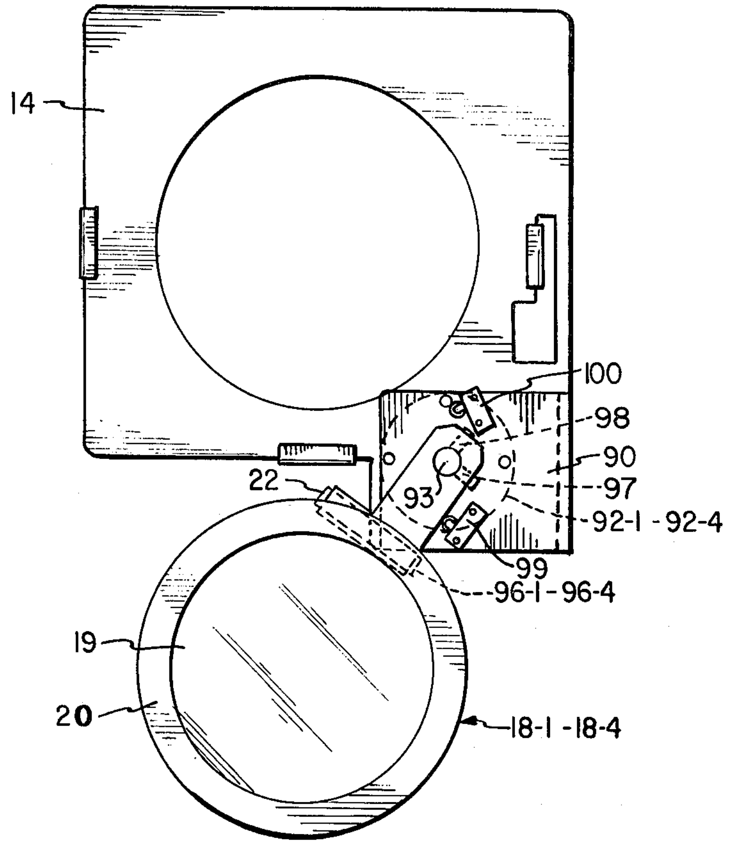
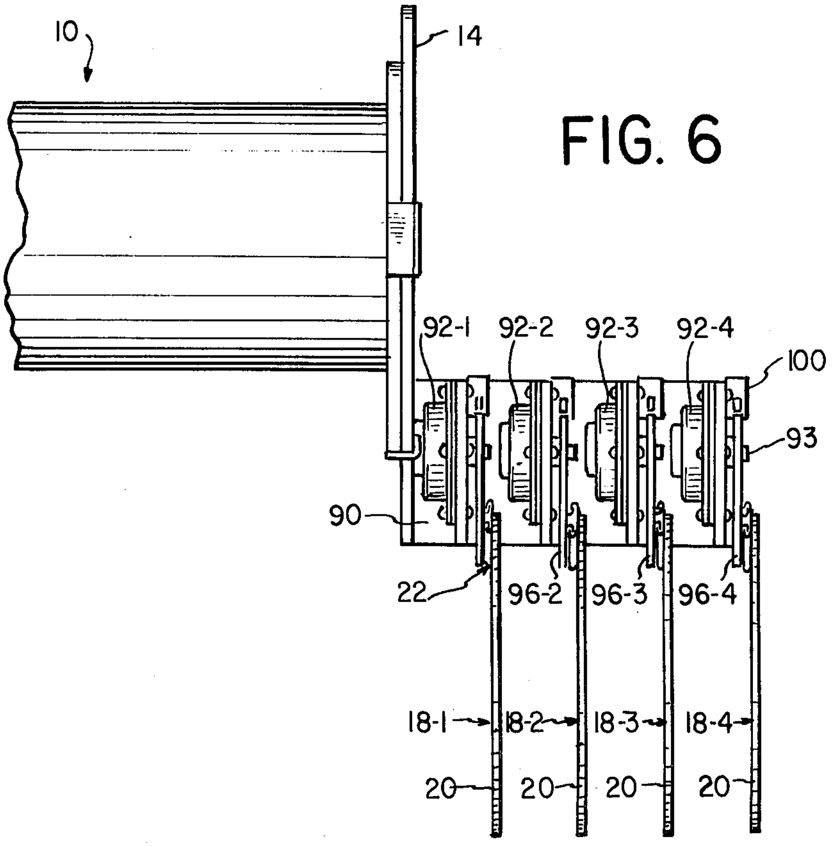
FIG. 6

COLOR CHANGER FOR SPOTLIGHTS

This invention relates to an apparatus for changing filter slides, dousers, scrims or effects or mechanical dimmers in a lighting system or projection or display system, for example, a spotlight which is used for entertainment purposes. In such arrangements a light source is provided, for example, either an electric lamp or a carbon arc lamp and often a lens or projection system, in front of which is located a plurality of slides having patterns, dousers, scrims or effects or mechanical dimmers or various colors and/or shapes. The slides are to be selectively placed in front of the lamp, one or more at a time, to produce a different color light or other effect. In some instances, no slide is used so that the lamp may produce a white light or a light the color of its source or its internal lens or filter system.

Apparatus of this general type is known. For example, in Kliegl U.S. Pat. No. 1,818,718, a filter slide changer is disclosed which uses four Selsyn-type motors. The output drive shafts of the motors are concentrically mounted, with a respective filter slide being connected to each shaft. A similar arrangement with concentric shafts for moving the slides is disclosed in Kliegl U.S. Pat. No. 1,875,814. In the latter patent, solenoids are used instead of Selsyn motors. U.S. Pat. No. 2,133,608 to Engelken also shows an arrangement similar to Kliegl U.S. Pat. No. 1,875,814 and includes in the motor drive a train of speed reducing gears. Levey U.S. Pat. No. 2,192,520 also shows a Selsyn motor drive system. Greenwald U.S. Pat. No. 1,820,899 uses a worm gear drive for the slides while Davis U.S. Pat. No. 3,255,666 shows a manually controlled system. Councilman et al U.S. Pat. No. 3,382,024 shows a system where all filters in front of the source must be moved away together before the filters can be changed.

In many applications (for example, in night club acts, theatres, spots arenas) it is desirable to use a plurality of light sources to be able to obtain a variety of artistic and aesthetic effects. In general, the prior art slide changes are relatively expensive and cumbersome. For example, conventional motor-driven systems are relatively complicated and heavy. They also are relatively slow acting, depending upon the motor speed. Further, where gear trains are used in the slide changing drive mechanism, these are subject to failure, backlash and other similar problems normally associated with gear systems. Because of this, it is difficult to justify the cost of purchasing a slide changer for each light source used in a given application and, also, to be able to operate these changers in a simple and economical manner. For these reasons, slide changers have not had wide use and their availability is still limited in the stage lighting field.

In accordance with the subject invention, a slide changer is provided which can readily adapt a spotlight or other light source, so that one or more slides having filters, color slides, effects, dousers, patterns, mechanical dimmers, etc., can be used with it. The invention includes a modular type slide changer unit which can be attached to a spotlight in a relatively simple manner and which can include one or more slides. The modular unit contains a driving means for the various slides. The driving means includes a separate drive element of novel construction for each slide which can selectively move a slide in front of and away from the light source. The invention further includes a novel and simple control system for operating the changing mechanism so that one or more slides can be controlled at the same time. Further, a novel and simple arrangement is provided for attaching the individual slides to the drive mechanism so that a variety of colors, effects, scrims, dousers or dimmers can be used.

It is therefore an object of the invention to provide a novel slide changing mechanism for a light source.

A further object is to provide a novel slide changing mechanism which automatically positions one or more slides with respect to a light source.

An additional object is to provide a novel slide-changing mechanism which is compact in size, smooth and rapid in operation and which is accurate and reliable.

Yet a further object is to provide a slide-changing mechanism for a light source which uses a linear actuator to drive the slides.

Another object is to provide a slide changing mechanism for a light source which uses a gas driven actuator to drive the slides.

Other objects and advantages of the present invention will become more apparent upon reference to the following specification and annexed drawings, in which:

FIG. 5 is a front view of a further embodiment of the invention; and

FIG. 6 is a side elevational view of the embodiment of FIG. 5.

Figure 1:
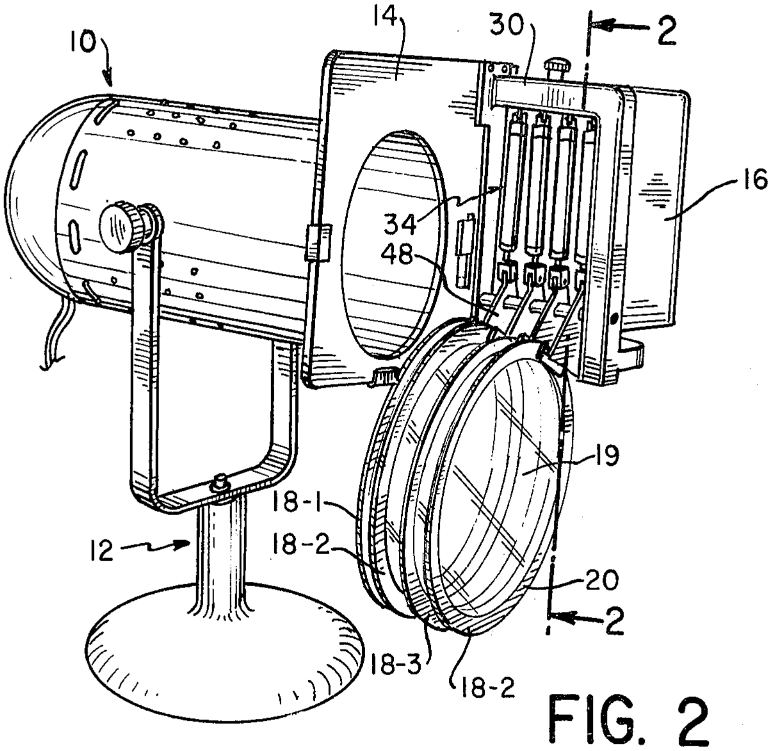
FIG. 1 is a perspective view of the novel slide-changing mechanism shown attached to a spotlight.

Referring to the drawings, the invention is shown for use with an electrical lamp 10 of any conventional construction mounted on a supporting stand 12. The lamp 10 can contain any suitable light source, for example, an electric light, carbon arc lamp, etc. The light source itself forms no part of the subject invention.

The preferred embodiment of the slide changing mechanism of the subject invention is a modular unit in the sense that it can be attached to an existing light source. This is done by the use of an adapter plate 14 having an opening corresponding to that of the light source. To provide stability in mounting the slide changer, the adapter plate surrounds all or a portion of the front of the light source. The rear surface (not shown) of the adapter plate includes any suitable means for attaching the plate to the light source, lamp housing 10. This can include, for example, a ring flange which can be clamped to the housing 10, attachment by the use of sheet metal screws, or any other suitable means.

A housing 16 for the drive mechanism is attached to the adapter plate 14. Housing 16 can be fabricated by any suitable technique. Metal is preferably used for the housing material due to the heat generated by the light source. Housing 16 contains the necessary drive elements for moving individually or simultaneously one or more of a plurality of slides 18-1 through 18-4. While four slides are shown, it should be understood that fewer or more slides can be utilized as desired.

Figure 4:
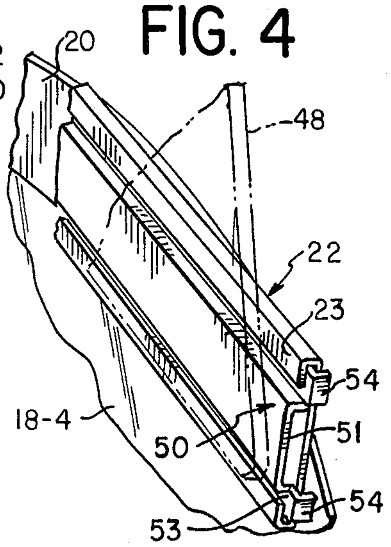
FIG. 4 is a perspective view of the arrangement for attaching each slide to its drive element.

In the preferred embodiment of the invention as shown, each of the slides 18 is of generally conventional construction. It contains a gel or glass, or celluloid member 19 which can be a color filter, pattern douser effect, mechanical dimmer in a circular frame 20. Slide frame shapes other than circular can be used. All of these, whether a color filter or some other effect is referred to herein as a slide. As shown best in FIG. 4, each frame 20 has a clip 22 attached thereto by any suitable means, for example, spot-welding. The clip 22 has a U-shaped leg 23 on each edge thereof. As will be described in detail below, this clip is used to attach a respective slide 18 to its drive element.

Figure 2:
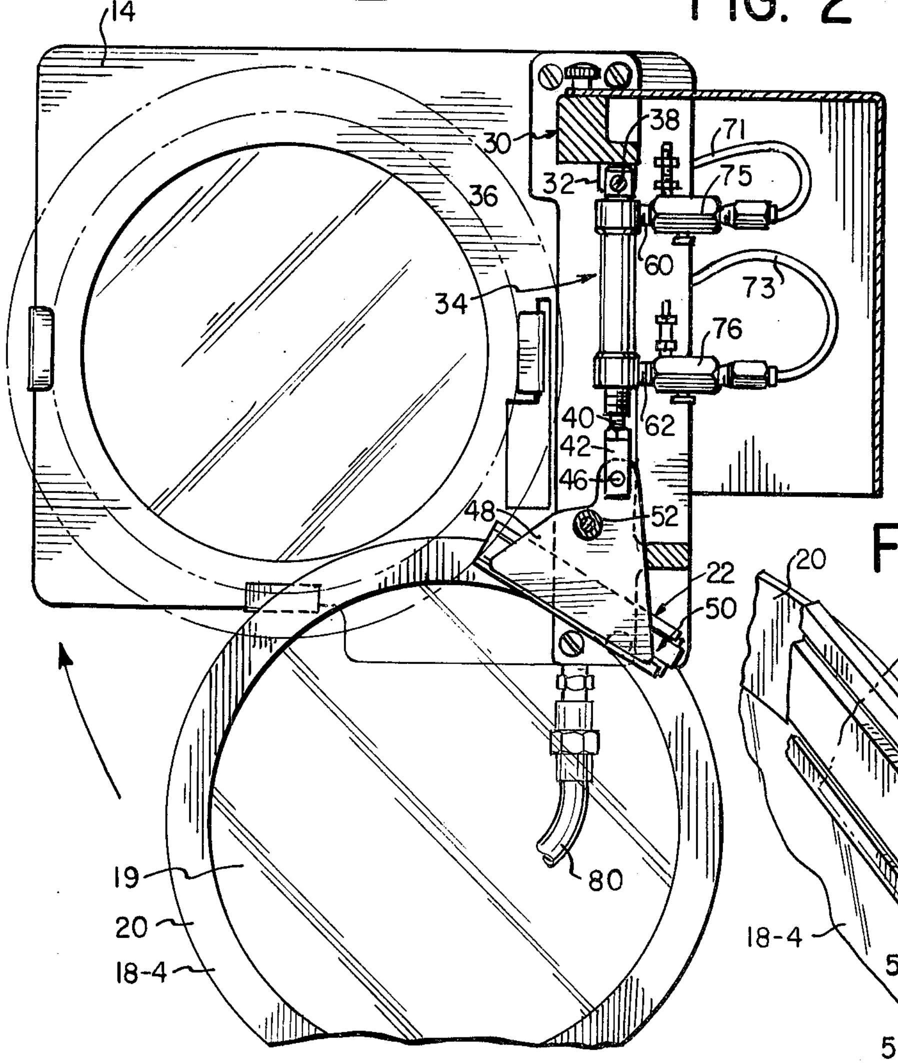
FIG. 2 is a front view of a portion of the slide changing mechanism taken along lines 2—2 of FIG. 1.
Figure 3:
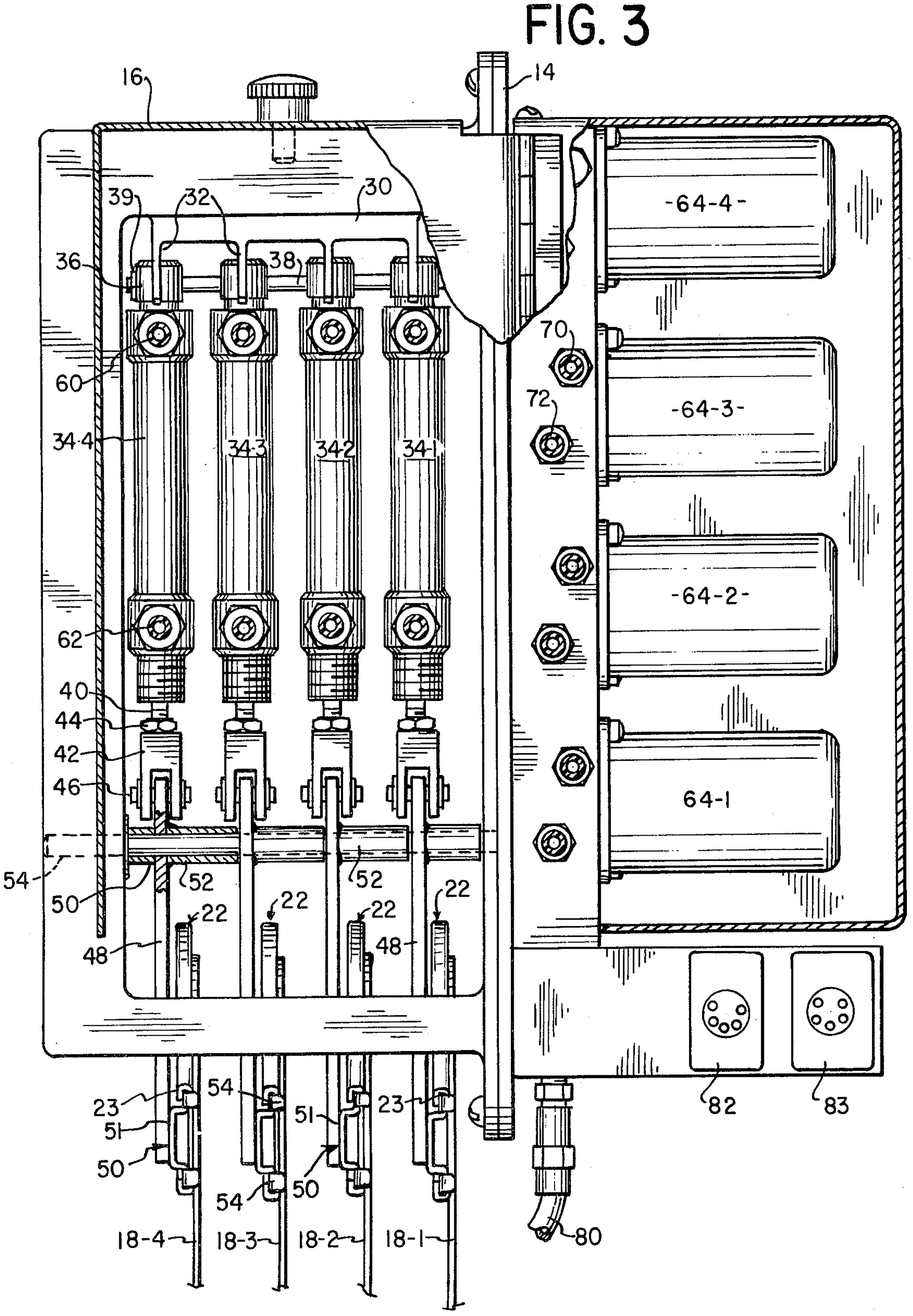
FIG. 3 is a back view of the slide changing mechanism.

The details of the changer drive mechanism are best shown by referring to FIGS. 2 and 3. An upper support bracket 30 is attached to the housing. The bracket 30 has a number of downwardly extending fingers 32 corresponding to the number of slides. Each finger has a hole therein for mounting the slide driven member.

In the preferred embodiment of the invention described, each drive element includes an air cylinder 34, there being one air cylinder for each of the respective slides 18. Since each of the air cylinders 34 and the connection to its respective slide 18 is of the same construction, only one is described in detail.

Each of the air cylinders has a bifurcated upper mounting member 36 which accepts a finger 32 of the bracket 30 therebetween. A mounting pin 38 passes through the mounting members 36 of all of the cylinders and the tabs 32. The pin 38 is fastened by any suitable means, for example, a nut 39 at one end thereof. The arrangement is such that each air cylinder 34 is free to pivot independently on mounting pin 38 and is restrained from longiudinal movement by a finger 32.

Each air cylinder 34 has a movable piston 40. A clevis 42 is attached at the free end of the piston and shown threaded up against a stop nut 44. A pivot pin 46 is held between the arms of the clevis.

A bell crank member 48 of generally triangular shape has a hole at the upper end thereof through which the clevis pivot pin 46 passes. This provides one pivot point for the crank member. The second pivot point is formed by a bearing sleeve 52 extending from a hole 50 in the bell crank. Bearing 52 is attached to the crank by any suitable means, for example, welding. A shaft 54 is fixed between the walls of housing 16. The respective bearing sleeves 52 are placed over the shaft 54 to rotate therearound.

Referring again to FIG. 4, each crank member 48 has a mounting bracket 50 attached thereto which has a center strip 51 and an upwardly bent L-shaped leg 53 with a stop tab 54 at the end thereof. The U-shaped sides of the clip 22 attached to the slide frame 20 fit around and slide over the legs 53 of a bracket 50 until stopped by the tabs 54. Thus, a frame 20 can be attached to or removed from a crank member 48 merely by sliding its clip 22 over the mounting bracket 50. This makes it easy to remove and/or change different types of slides to obtain a desired effect.

The changer mechanism operates as follows. When air pressure is applied to a respective cylinder 34 so as to move its shaft 40 downwardly as seen in FIGS. 1 and 2, this pivots the respectively connected crank 48 clockwise about its two pivot points, pin 46 and shaft 54. This in turn moves the respectively attached slide 18 clockwise, from its lowermost position as shown in FIG. 2, to its position in front of the light source as shown in FIG. 2 by the phantom lines. Similarly, a supply of gas to a cylinder 34 causing its piston 40 to retract pivots the respective crank member 48 in a counter-clockwise direction. This moves the respectively connected slide 18 from a position in front of the light to its lower, or rest, position as shown in FIG. 1.

The cylinders 34 are preferably of the double-acting type. They require gas pressure both to extend and to retract their respective pistons. This maintains a smooth and controlled motion of the crank members 48 and the filters 18 in both directions. Since the length of travel of the piston 40 can be set as a function of the cylinder operation, each filter is accurately positioned in front of the light source. The speed of movement of the pistons 40 is controlled by flow controllers on the inlets and exhausts of the respective cylinders. As an alternative to this, a single acting gas cylinder can be used with a three-way control valve. This would require gas pressure only in one direction in the cylinder.

The cylinders 34 can be of any suitable type, for example, Model 0151-1019-014 made by the Aro Company of One Aro Center, Bryan, Ohio 43506. Each of the cylinders 34 has a pair of inlet connections 60 and 62. Gas is supplied to each of the cylinders 34 by a respective actuator 64 which is preferably electrically controlled. One suitable actuator is sold under the trademark TYNA-MITE, and is made by the Humphrey Products Co. of Kalamazoo, Mich. This actuator is basically a solenoid actuated type device having valves and is of a type which supplies gas to a respective cylinder 34 to move its respective piston 40 one way or the other. As gas is applied to one side of the piston to drive it in one direction, the gas already in the piston which would oppose this motion is exhausted. Each of the actuators 64 has a respective pair of outlets 70 and 72. Connection is made from an actuator outlet 70 to a respective cylinder inlet 60 by a conduit 71 and from an actuator outlet 72 to a respective cylinder inlet 62 by a conduit 73 (See FIG. 2). A separate set of conduits 71 and 73 is provided between each cylinder 34 and actuator 64.

As shown in FIG. 2, each conduit 71 has a respective flow control valve 75 and each conduit 73 a flow control valve 76. Valves 71 and 73 are of a conventional type and have a common form of adjustment 75*a*,76*a*, for example a needle valve, so that the rate of the gas pressure passing into or exhausting from the cylinder can be controlled. The control valves 75,76 are adjusted to provide a smooth movement of the slides. It should be understood that due to the double acting nature of piston 40, a valve 75 or 76 can alternately act as an inlet or an exhaust valve. The solenoid valves also preferably have exhaust and speed controls.

The gas supply for the system is provided from any suitable source for example, a compressor. Where the changer mechanism is intended for portable operation, a tank of compressed air, carbon dioxide, or any other suitable gas can be used. The gas is applied through a conduit 80 to a manifold (not shown) to which the various outlet connectors 70 and 72 of the actuators 64 are connected. Electrical connectors 82 and 83 are shown for the purpose of applying control signals to the various actuators 64. The appropriate electrical control signals are provided to the actuators by a switch panel (not shown). The signals selectively control the actuators 64 to cause gas to be applied to or exhausted from the conduits 71 and 73 associated with a respective actuator. Thus, the piston of the cylinder 34 controlled by the actuator is moved in one direction or other, causing, in turn, the corresponding movement of the connected slide into or out of the path of light from the source 10.

The flow control valves on the inlets and exhausts of the cylinders and the exhaust speed controls on the solenoid actuator valves enable the frames to be timed or synchronized to provide either a smooth slow cross-fade between two or more color filters, effects, dousers, patterns, mechanical dimmers or a quick fast change between colors, effects, patterns, etc.

The various valves also permit the colors, filters, effects, etc., to be timed to change without a flash of white light if the light source is on when the slide change takes place. To ensure that there is no flash of white light, the slide frame moving up into position in front of the light source must cover the area in front of and surrounding the light before the frame already in position moves away.

Each of the actuators 64 and its respectively controlled cylinder 34 is independent of the other actuators or cylinders. Thus, it is possible that one or more of the cylinders 34 can be operated at a given time thereby permitting a plurality of slides 18 to be moved simultaneously in the same or opposite directions. For example, one slide can be moved into the path of the light as the other is being moved out. This makes the changer system quite versatile and it can create a wide variety of aesthetic effects.

While an air cylinder drive is shown for moving the respective cranks 48, it should be understood that other suitable types of linear actuators can be utilized. These include, for example, a linear actuator motor, etc. The broad principles of the invention would still be applicable therewith in the connection of a crank member for rotating the individual slide frames.

The slide changer of the subject invention can be substituted for manual slide changing apparatus in use on existing spotlight installations. For example, in the so-called "Super Trouper" carbon arc lamp made by Strong Electro Company of Toledo, Ohio, the slide changer can be used in place of the manually operated boomerang type slide changer. In this case the changer housing mounting piece would be placed between the arc electrodes and one of the projection lenses. The changer installation would be appropriately constructed so that no light was lost. That is, the area in which the slides moved would be enclosed.

As an added feature the changer of the invention is readily adaptable for a monitoring system for its gas supply. For example, a switch can be mounted adjacent each gas hose connector such as 70 and 72. The switches are wired back to the control panel to a visual indicating system, such as a plurality of lights. Each hose connector closes its switch when it is properly connected to the changer and this is indicated back at the control panel by the presence (or absence) of one of the corresponding lights. In this manner all of the hose connections can be easily monitored.

FIGS. 5 and 6 show a further embodiment of the invention in which the slide frame actuators are "pancake" motors, for example, of the type sold by B & B Motor and Control Corp., of New York, N.Y. 10012. These motors are fairly flat and a number of them can be stacked in line in a relatively small amount of space. For example a 1/13th horsepower motor, including shaft, is only about 3.2 inches high and a ⅛ horsepower about 3.8 inches.

In FIGS. 5 and 6, similar elements are referred to by the same reference numerals previously used.

A mounting bracket 90 is secured to the front plate 14 as illustratively shown, four of the pancake motors 92-1 through 92-4 are mounted on the bracket. A respective bell crank 96-1 through 96-4 is attached to the output shaft 93 of each of the motors. The crank is connected directly to the output shaft and rotates with it. The bell crank is generally L-shaped and has the mounting clip arrangement previously described with respect to FIG. 4 for holding the respective slides. A pair of set screws 97, 98 are mounted on each motor output shaft 93 and cooperate with a respective pair of limit switches 99, 100 which can be conventional microswitches.

Each of the motors 92 is of the type which can be separately controlled and can be either a DC or an AC motor. When a motor is actuated to rotate in one direction, its output shaft 93 rotates and moves its connected bell crank and associated slide into position in front of the light source. When the direction of motor rotation is reversed, the motor moves the slide it carries away from the front of the light source into the rest position. The set screws 97, 98 engage the respective microswitches 99, 100 to stop the rotation in one direction or the other.

As should be apparent, two or more of the motors can be operated simultaneously so that one slide can be moving into position while the other one is being retracted, two or more filters can be moved in the same direction at the same time, or other combinations of movement.

The space occupied by the motors 92 can be compressed somewhat by offsetting one with respect to the other.

What is claimed is:

1. A slide changer mechanism for use with a light source comprising:

at least one slide, a respective individually energizable actuator means for each said slide, a respective, pivotally mounted crank means for each said actuator means and its corresponding slide, means for attaching each slide to its respective crank means, each of said actuator means comprising a pneumatically operated cylinder having a bi-directional linearly moving piston having a free end, means for pivotally connecting a said crank means to the free end of its respective piston, means for selectively providing fluid to each said pneumatic cylinder to cause its piston to move in one direction or the other, and means for mounting each said cylinder with respect to its respective crank means to provide free rotation of said crank means in both directions about its pivot mounting as the piston of the pneumatic cylinder is moved.

2. A slide changer mechanism as in claim 1 wherein a said attaching means for a slide comprises a bracket on one of said slide and crank means and a clip slidable with respect to said bracket on the other of said slide and crank means.

3. A slide changer mechanism as in claim 1 wherein each said gas cylinder is of the double acting type having a pair of gas inlets.

4. A slide changer mechanism as in claim 3 further comprising control valve means connected to said gas inlets to control the rate of gas entry and exhaust.

5. A slide changer mechanism for use with a light source comprising:

a plurality of slides, a respective individually energizable actuator means for each of said slides for providing bi-directional motions thereof, a respective crank means connected between each of said slides and its actuator means to rotate the respective slides toward and away from the light source as the actuator means moves in one direction or the other, and means for detachably connecting each slide to its respective crank member, said detachable connecting means comprising a mounting bracket on one of the slides and the crank members and a clip slidable on said bracket on the other of said slide and crank members.

6. A slide changer as in claim 5 wherein said mounting bracket comprises a center strip with an upwardly bent L-shaped leg extending from each side thereof, said clip including U-shaped sides for fitting over the L-shaped legs.

7. A slide changer mechanism for use with a light source comprising:

at least one slide, a respective individually energizable actuator means for each said slide, a respective, pivotally mounted crank means for each said actuator means and its corresponding slide, means for attaching each slide to its respective crank means, each of said actuator means comprising a pneumatically operated cylinder having a bi-directional linearly moving piston having a free end which is connected to a said crank means, means for selectively providing fluid to each said cylinder to cause its piston to move in one direction or the other, and means for mounting each said cylinder with respect to its respective crank means to provide free rotation of said crank means in both directions about its pivot mounting as the piston of the cylinder is moved, said mounting means including means for pivotally mounting a crank means to the free end of the piston of its respective cylinder, and means for pivotally mounting the end of the cylinder remote from the piston free end.

* * * * *